United States Patent
Werner et al.

[15] 3,678,039
[45] July 18, 1972

[54] 4-TRIFLUOROMETHYL-ANTHRANILIC ACIDS

[72] Inventors: Lincoln Harvey Werner, 94 Larned Road; George De Stevens, 2 Warwick Road, Woodland Park, both of Summit, N.J. 07901

[22] Filed: April 27, 1967

[21] Appl. No.: 634,101

Related U.S. Application Data

[63] Continuation-in-part of Ser. No. 606,599, Jan. 3, 1967, which is a continuation-in-part of Ser. No. 553,703, May 31, 1966, abandoned, which is a continuation-in-part of Ser. No. 508,556, Nov. 18, 1965.

[52] U.S. Cl. ............ 260/239.6, 260/397.7, 260/239.65, 260/239.8, 260/239.9, 260/239.95, 260/518, 260/556, 260/332.2, 260/347.2, 260/295, 260/307, 260/305, 260/309.2, 260/326.12, 260/247.1, 260/287, 260/326.82, 260/268, 260/329, 260/465, 424/228, 424/229, 424/285, 424/321
[51] Int. Cl. .................................................. C07d 5/14
[58] Field of Search .......................... 260/239.6–239.95, 260/397.7, 556, 515, 518, 558 X, 558 H, 430

[56] References Cited

UNITED STATES PATENTS

| | | | |
|---|---|---|---|
| 3,072,656 | 1/1963 | Werner et al. | 260/397.7 |
| 3,058,882 | 10/1962 | Sturm et al. | 260/397.7 |
| 3,009,910 | 11/1961 | Ziegler | 260/239.6 |
| 2,910,488 | 10/1959 | Novello | 260/397.7 |

FOREIGN PATENTS OR APPLICATIONS 1,122,541  8/1962  Germany ....................... 260/397.7

OTHER PUBLICATIONS

Sturm et al., Ber., Vol. 99, pp. 328–343 (1–1966) QD1D4
Yale et al., J. Med. Chem., vol. 1 pp. 121–133 (1959) RS1J5
Jucker et al., Arzneimi Telforschung, vol. 13, pp. 269–280 (1963)

*Primary Examiner*—Henry R. Jiles
*Assistant Examiner*—Harry I. Moatz
*Attorney*—Harry Goldsmith, Joseph G. Kolodny and Bryant W. Brennan

[57] ABSTRACT

5-Sulfamyl-4-trifluoromethyl-anthranilic acids of the formula I

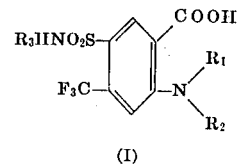

(I)

$R_1$ = aliphatic or araliphatic hydrocarbon radical or aryl
$R_{2,3}$ = H, aliphatic or araliphatic hydrocarbon or acyl radical or aryl esters and salts thereof, particularly the N-furfuryl-4-trifluoromethyl-5-sulfamyl-anthranilic acid, exhibit diuretic effects.

9 Claims, No Drawings

4-TRIFLUOROMETHYL-ANTHRANILIC ACIDS

CROSS-REFERENCES TO RELATED APPLICATIONS

This is continuation-in-part of application Ser. No. 606,599, filed Jan. 3, 1967, which in turn is a continuation-in-part of application Ser. No. 553,703, filed May 31, 1966, now abandoned, which in turn is a continuation-in-part of application Ser. No. 508,556, filed Nov. 18, 1965.

SUMMARY OF THE INVENTION

The present invention concerns and has for its object the provision of new 5-sulfamyl-4-trifluoromethyl-anthranilic acids and their acid derivatives, more particularly those of formula I, in which $R_1$ stands for an aliphatic or araliphatic hydrocarbon or an aryl radical, each of $R_2$ and $R_3$ for hydrogen, an aliphatic or araliphatic hydrocarbon or acyl radcial or for an aryl radical, esters thereof and salts of these compounds, as well as corresponding pharmaceutical compositions, new starting materials and methods for the preparation of the new compounds. Said compositions are useful as orally applicable diuretic and natriuretic agents in order to relieve excessive water and/or salt retention, for example in connection with heart and kidney diseases, as well as in the adjunctive management of hypertension.

DESCRIPTION OF THE PREFERRED EMBODIMENTS

The aliphatic or araliphatic hydrocarbon radicals mentioned above may be interrupted by, and the aryl radicals may contain, hetero atoms, such as nitrogen, oxygen and/or sulfur atoms. Aliphatic radicals are, for example, lower alkyl, such as methyl, ethyl, n- or i-propyl, -butyl, -pentyl, -hexyl or -heptyl, lower alkenyl, such as vinyl, allyl, methallyl, 2-butenyl or 3-methyl-2-butenyl, lower alkynyl, such as propargyl, cycloalkyl, cycloalkenyl, cycloalkyl-lower alkyl or cycloalkenyl-lower alkyl which may be mono- or bicyclic and have preferably three to seven ring-carbon and one to four chain-carbon atoms, such as cyclopropyl, 2,3-dimethyl-cyclopropyl, cyclobutyl, cyclopentyl, 2- or 3-methyl-cyclopentyl, 2,5- or 3,4-dimethyl-cyclopentyl, cyclohexyl, 2-, 3- or 4-methyl-cyclohexyl, 2,3-, 2,4- or 3,4-dimethyl-cyclohexyl, 2,4,6-trimethyl-cyclohexyl, cycloheptyl, cyclooctyl, 2- or 7-norbornanyl, 1- or 2-decahydronaphthyl and the corresponding cycloalkyl-lower alkyl groups, in which the the chain especially represents methyl, but also ethyl, propyl, straight or branched butyl, and contains in any of the positions available for substitution one of the specific cycloalkyl groups listed above. A cycloalkenyl or cycloalkenyl-lower alkyl group represents, for example, 1- or 2-cyclopentenyl, 2,4-cyclopentadienyl, 2- or 3-methyl-2-cyclopentenyl, 4,5-dimethyl-2-cyclopentenyl, 1-, 2- or 3-cyclohexenyl, 2,5-cyclohexadienyl, 2-, 3- or 4-methyl-1- or 2-cyclohexenyl, 2,4- or 3,5- dimethyl-1- or 2-cyclohexenyl, 2,4,6 1-, 2- or 3-cycloheptenyl), 2,6-cycloheptadienyl, 2-cyclooctenyl or 2-norborn-5-enyl and the corresponding cycloalkenyl-lower alkyl groups in which the chain has the previously-given meaning and contains in any of the positions available for substitution one of the specific cycloalkenyl groups listed above. $R_1$ and $R_2$, when taken together, may also represent lower alkylene or alkenylene, such as ethylene, 1,3-propylene, 1,4-butylene, 1,4-or 1,5-pentylene, 1,5-, 2,5- or 1,6-hexylene or 2,6-heptylene; 1,4-but-2-enylene, 1,4- or 1,5-pent-2-enylene, 1,5-hex-2-enylene, 1,6-hex-3-enylene or 2,6-hept-3-enylene. An araliphatic hydrocarbon or an aryl radical preferably stands for mono- or bicyclic carbocyclic or heterocyclic, especially mono-aza, oxa- or thiacyclic, aryl-lower alkyl, aryl-lower alkenyl or aryl, in which the lower alkyl or alkenyl moiety preferably has only up to four chain-carbon atoms, such as benzyl, 1- or 2-phenylethyl, 1-, 2- or 3-phenyl-propyl, 2-phenyl-2-propyl, 1-, 2-, 3- or 4-phenyl-butyl, 1- or 2-phenyl-2-butyl; styryl or cinnamyl, and the corresponding heterocyclic aralkyl, aralkenyl or aryl radicals in which aryl is, for example, 2-, 3- or 4-pyridyl, 2- or 3-furyl or -thienyl, 5-(1,2-oxazolyl), 2-(1,3-oxazolyl), 2-(1,3-thiazolyl) or 2-benzimidazolyl. Araliphatic hydrocarbon radicals are also partially hydrogenated, preferably bi- or tricyclic aryl radicals, bound at the aliphatic portion, such as 1- or 2-indolinyl, 1- or 2-(1,2,3,4-thtrahydronaphthyl) or 9-fluorenyl. A hydrocarbon radical that is interrupted by hetero atoms is, for example, lower aza-, oxa or thia-alkylene (representing $R_1$ and $R_2$), such as 3-aza-, 3-oxa- or 3-thia-pentylene-(1,5), 3-methyl or ethyl-3-aza-pentylene-(1,5), 3-aza-hexylene-(1,6) or 4-aza- or oxaheptylene-(2,5), furthermore sec. or tert. amino-lower alkyl, such as mono- or di-lower alkylamino-lower alkyl, lower alkylene-imino-lower alkyl, lower aza-, oxa- or thia-alkyleneimino-lower alkyl, e.g. 2-ethylamino-ethyl, 2-dimethylamino-ethyl, 3-diethylamino-propyl, 2-pyrrolidino-ethyl, 2-piperidino-ethyl, 2-(4-methyl-piperazino)-ethyl or 2-morpholino-ethyl, or lower alkoxy- or alkylmercapto-lower alkyl, such as 2-ethoxy-ethyl or -propyl, 3-methoxy-propyl or 2-ethylmercapto-ethyl.

These radicals may be unsubstituted or substituted, especially in the aromatic portion, by one or more than one of the same or of different substituents, for example, lower alkyl groups, such as those mentioned above, free or functionally converted hydroxy or mercapto groups, such as lower alkoxy or alkylmercapto, halogen, e.g. fluoro, chloro or bromo, trifluoromethyl, nitro, amino, especially di-lower alkylamino, e.g. dimethylamino or diethylamino, sulfamyl, carbamyl or cyano. Such substituted aliphatic radicals are, for example, lower haloalkyl, e.g. 2-chloro-, bromo- or iodo-ethyl, 2,2-difluoro- or dichloro-ethyl, 3,3,3-trifluoro- or trichloro-ethyl, 2- or 3-fluoro- or chloro-propyl or 2,2-dichloropropyl, halogenated lower alkoxy- or alkylmercapto-lower alkyl, such as 2-(2-chloroethoxy)-ethyl, 2-(2,2-dichloroethoxy(-ethyl, 2-(2,2,2-trifluoroethylmercapto)-ethyl or 2-(2,2-dichloroethylmercapto)-ethyl, carbamyl-lower alkyl, such as carbamyl-methyl, N,N-dimethylcarbamyl-methyl, 2-carbamyl-ethyl or 2-N,N-diethylcarbamyl-ethyl. In the compounds containing the above aliphatic radicals, two hetero atoms are separated by at least two carbon atoms. Preferred substituted aryl moieties are (lower alkyl)-phenyl, (lower alkoxy)-phenyl, (lower alkylmercapto)-phenyl, (halogeno)-phenyl, (trifluoromethyl)-phenyl, (di-lower alkylamino)-phenyl, (lower alkyl)-furyl or (lower alkyl)-thienyl.

An acyl radical preferably stands for lower alkanoyl, such as acetyl, propionyl, butyryl or pivalyl, but also for lower alkenoyl, such as acryloyl or methacryloyl, monocyclic carbocyclic aroyl or aryl-lower alkanoyl or alkenoyl, such as benzoyl, phenylacetyl or connamoyl. These acyl radicals may be unsubstituted or substituted as shown for the above hydrocarbon radicals.

Esters of the compounds of Formula I are particularly those of lower alkanols, such as methanol, ethanol, 1- or 2-propanol, 1-, 2- or tert. butanol, or of monocyclic carbocyclic aryl-lower alkanols, such as benzyl alcohol or 2-phenyl-ethanol.

The compounds of the invention exhibit valuable pharmacological properties. Apart from hypotensive effects, they show primarily diuretic activity, as can be demonstrated in animal tests using, for example mammals, e.g. rats or dogs,as test objects. Besides their above mentioned utility, the compounds of the invention are also useful intermediates in the preparation of other valuable products primarily of pharmacologically active compounds.

Particularly useful are the compounds of Formula II

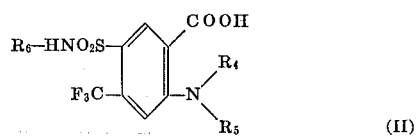

(II)

in which $R_4$ stands for lower alkyl, lower alkenyl, cycloalkyl, cycloalkenyl, cycloalkyl-alkyl or cycloalkenyl-alkyl with five to seven ring-carbon and one to four chain-carbon atoms, monocyclic carbocyclic or monoaza-, oxa- or thiacyclic arylalkyl with one to four chain-carbon atoms, lower fluoro- or chloroalkyl, lower alkoxy- or alkylmercapto-lower alkyl, lower fluoro- or chloroalkoxy- or -alkylmercapto-lower alkyl, di-lower alkylamino- or lower alkyleneimino-lower alkyl, $R_5$ for hydrogen, lower alkyl or lower alkanoyl and $R_6$ for hydrogen, lower alkyl, cycloalkyl, cycloalkenyl, cycloalkyl-alkyl or cycloalkenyl-alkyl with five to seven ring-carbon and one to four chain-carbon atoms, monocyclic carbocyclic or monoaza-, oxa- or thia-cyclic aryl or aryl-alkyl with one to four chain-carbon atoms, wherein two hetero atoms in the aliphatically substituted compounds are separated by at least two carbon atoms and carbocyclic aryl is unsubstituted or substituted by lower alkyl, lower alkoxy, lower alkylmercapto, halogeno, trifluoromethyl or di-lower alkylamino and heterocyclic aryl is unsubstituted or substituted by lower alkyl, and alkali metal, alkaline earth metal or ammonium salts thereof.

Especially valuable are the compounds of Formula II in which $R_4$ stands for benzyl, 1- or 2-phenyl-ethyl, furfuryl or thenyl, $R_5$ for hydrogen, benzyl or alkanoyl with one to four carbon atoms and $R_6$ for hydrogen, methyl, phenyl, benzyl, 1- or 2-phenylethyl, furfuryl or thenyl, and alkali metal, alkaline earth metal or ammonium salts thereof, which when given to rats at oral doses between about 25 and 100 mg/kg/day, or to dogs at oral doses between about 5 and 50 mg/kg/day, show outstanding diuretic activity.

The compounds of the invention are prepared according to methods in themselves known. Advantageously they are obtained by a. reacting a compound of the Formula III

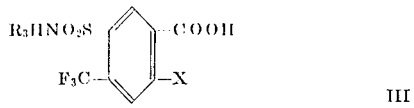

in which X stands for halogen, preferably fluoro or chloro, or an ester, halide, amide or hydrazide thereof, with the amine $R_1$-NH-$R_2$, or b. reacting a compound of the Formula IV

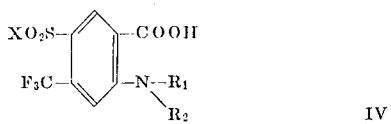

or an ester, halide, amide or hydrazide thereof, with that of the formula $R_3$-NH$_2$ and hydrolyzing any resulting amide or hydrazide and/or if desired, converting any resulting compound into another disclosed compound.

Any ester used as starting material may be such as described above for the final products. The amides or hydrazides used as starting materials may be N-substituted or N-unsubstituted, for example, by one or more than one aliphatic, araliphatic or aromatic radical, e.g. any of those described above.

The above process is carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

In the above reaction the amine reagent is advantageously used in excess, in order to neutralize the generated acid. It may, however, also be used in equivalent amounts and in the presence of other condensing agents such as inorganic or organic bases, e.g. alkali metal carbonates or bicarbonates or tertiary nitrogen bases, for example, tri-lower alkylamines, N,N-dimethylaniline or pyridine.

Any resulting amide or hydrazide is hydrolyzed in the usual manner, for example, with the use of an alkali, e.g. aqueous alkali or alkaline earth metal hydroxides, or quaternary ammonium hydroxides. The compounds of the invention so obtained may be converted into each other according to known methods. For example, resulting compounds in which $R_{2,3}$ stands for hydrogen may be reacted with a reactive ester of a corresponding alcohol, for example, that of a hydrohalic or sulfonic acid, or may be acylated, for example, with a reactive functional derivative of a corresponding acid, such as a halide or anhydride thereof, or resulting acyl derivatives may be hydrolyzed, for example with the use of acidic or alkaline hydrolyzing agents. Resulting esters may be hydrolyzed or transesterified or resulting acids esterified in known manner.

The compounds of the invention are obtained in the free form or in the form of their salts, depending on the conditions under which the process is carried out, the salts are also included in the present invention. These are particularly derived from the free acids and therapeutically useful inorganic of organic bases, primarily the alkali metal, alkaline earth metal, e.g. sodium, potassium, magnesium or calcium salts, or ammonium salts derived from ammonia or amines, such as those corresponding to the amino group

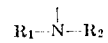

, e.g. mono-, di- or tri-lower alkylamines, -cycloalkylamines, -cycloalkyl-lower alkylamines, or -aralkylamines, mixed amines or quaternary nitrogen bases, such as pyridine, collidine or lutidine.

The invention further includes any variant of the present process in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, in case the amine $R_1$-NH-$R_2$ is identical with $R_3$-NH$_2$, it may be reacted in a single step with a 2-halo- 4-trifluoromethyl-5-halosulfonyl-benzoic acid or a functional derivative thereof, whereby compounds of the Formula III or derivatives thereof, are formed under the reaction conditions. Mainly, those starting materials should be used in the reactions of the invention that lead to the formation of those compounds indicated above as being especially valuable.

The starting material is new, but can be prepared according to known methods. For example, 3-(fluoro or chloro)-4-bromo-benzotrifluoride or 3-(fluor, chloro or bromo)-4-iodo-benzotrifluoride is converted into a 4-metal compound, e.g. a Grignard compound, which is then carbonated in order to yield the 2-(fluor, chloro or bromo)-4-trifluoromethyl-benzoic acid. The latter, or an acid derivative thereof, is either halosulfonated or reacted with the amine $R_1$-NH-$R_2$ to yield the corresponding 5-halosulfonyl-compounds, anthranilic acids or their derivatives respectively. The former can be reacted with the compound $R_3$-HN$_2$ in order to obtain a compound of Formula III or a derivative thereof, and the latter, or a corresponding N-acyl derivative thereof, can be halo-sulfonated to yield a compound of Formula IV or a derivative thereof. Another method for the preparation of the starting material of Formula III consists in halosulfonating a 3-amino-4-halo-benzotrifluoride, converting the resulting 5-halo-2-trifluoromethyl-sulfanilic acid in its halide and reacting the latter with the compound $R_3$-NH$_2$ in order to obtain a corresponding 5-halo-2-trifluoromethyl-sulfanilamide. This is reacted with cuprous cyanide to yield the corresponding 5-sulfamyl-4-trifluoromethyl-anthranilic acid nitrile, which can be hydrolized in conventional manner. The resulting anthranilic acid or its amide is then converted into the diazonium salt, which according to the Sandmeyer reaction yields the desired starting material. The intermediary N-unsubstituted 5-sulfamyl-4-trifluoromethyl-anthranilic acid may also be obtained by potassium permanganate oxidation of a 4-sulfamyl-5-trifluoromethyl-o-toluidine. Also most of the intermediates in said synthesis, starting from the 2-halo-4-trifluoromethyl-benzoic acids and the derivatives thereof, are new and are further an object of the present invention.

Particularly useful are the intermediates of Formula III in which X stands for fluoro or chloro and R₃ for hydrogen, especially the amide, mono- or di-lower alkyl or aralkylamindes, the hydrazide, mono- or N',N'-di-lower alkyl or aralkylhydrazides thereof, which show primarily hypotensive effects, as can be demonstrated in animal test using, for example mammals, e.g. dogs, as test objects.

Especially valuable are the compounds of Formula V

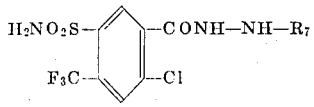

(V)

in which R₇ stands for benzyl or furfuryl which, when given to dogs at oral doses between about 5 and 50 mg/kg/day, show outstanding hypotensive effects.

The pharmacologically active compounds of the invention can be used for example, for the manufacture of pharmaceutical compositions, containing them in conjunction or admixture with inorganic or organic, solid or liquid pharmaceutical excipients suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. These compositions are prepared by conventional methods; they usually contain about 0.1 to 75 percent, particularly 1 to 50 percent of the active ingredient.

The following examples illustrate the invention and are not to be construed as being limitations thereon. Temperatures are given in degrees Centigrade and all parts wherever given are parts by weight.

EXAMPLE 1

6 g 2-Chloro-5-sulfamyl-4-trifluoromethyl-benzoic acid are dissolved in 20 ml diethyleneglycol dimethyl ether, 6.4 g benzylamine are added and the reaction mixture is heated to 160° for 2 to 3 hours. It is then concentrated in vacuo, water is added to the residue and the aqueous solution is decanted from any insoluble material. It is treated with charcoal, filtered and acidified whereby the desired 2-benzylamino-5-sulfamyl-4-tri-fluoromethyl-benzoic acid of the formula

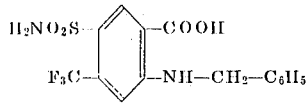

separates; it is allowed to crystallize and is recrystallized from aqueous ethanol.

The starting material is prepared as follows: 2.43 g of magnesium turnings are placed in a flask, covered with 12 ml anhydrous diethyl ether, 2.5 g 4-bromo-3-chloro-benzotrifluoride and a small crystal of iodine are added. The reaction mixture is heated gently until the reaction starts, then a solution of 23.5 g 4-bromo-3-chloro-benzotrifluoride in 65 ml anhydrous di-ethyl ether is added with stirring at a rate that the reaction continues vigorously. After the addition is completed, the reaction mixture is refluxed gently for 30 minutes. Following the addition of 55 ml benzene, the mixture is cooled to −7° and dry carbon dioxide is bubbled in at such a rate that the temperature does not rise above −2°; the reaction is completed when the temperature drops. Hereupon diluted sulfuric acid is added to decompose the magnesium salts and the reaction mixture is extracted with diethyl ether. The combined extracts are shaken with three portions of 25 percent aqueous sodium hydroxide, the combined alkaline extracts are wahsed with diethyl ether and acidified to yield the 2-chloro-4-trifluoromethyl-benzoic acid.

10 g thereof are added to 50 g chlorosulfonic acid with stirring and the mixture is heated to 170° for 3 hours. After cooling the melt is carefully poured over ice and water whereby the crude 2-chloro-5-chlorosulfonyl-4-trifluoromethyl-benzoic acid precipitates in crystalline form. It is filtered off and added slowly to 50 ml concentrated ammonia with cooling in an ice bath. After allowing to stand at room temperature for 3 hours the solution is heated it expell ammonia. Hereupon it is filtered through charcoal and acidified. The 2-chloro-5-sulfamyl-4-trifluoromethyl-benzoic acid precipitates in crystalline form; it is filtered off and recrystallized from aqueous ethanol.

EXAMPLE 2

In the manner described in Example 1, the following compounds are prepared from the equivalent amount of the corresponding starting materials:

2-cyclopentylmethylamino-5-sulfamyl-4-trifluoromethyl-benzoic acid, 2-(3-cyclopentenyl-methylamino)-5-sulfamyl-4-trifluoromethyl-benzoic acid, 2-(2-cyclopentyl-ethylamino)-5-sulfamyl-4-trifluoromethyl-benzoic acid, 2-cyclohexyl-methylamino-5-sulfamyl-4-trifluoromethyl-benzoic acid, 2-(3-cyclohexenyl-methylamino)-5-sulfamyl-4-trifluoromethyl-benzoic acid, 2-cyclopropylmethylamino-5-sulfamyl-4-trifluoromethyl-benzoic acid, 2-(4-hydroxymethyl-cyclohexylmethylamino)-5-sulfamyl-4-trifluoromethyl-benzoic acid, 2-(2-norbornanyl-methylamino)(-5-sulfamyl-4-trifluoromethyl-benzoic acid, 2-(2-norborn-5-enyl-methylamino)-5-sulfamyl-4-trifluoromethyl-benzoic acid, 2-(3-methyl-furfurylamino)-5-sulfamyl-4-trifluoromethyl-benzoic acid, 2-(4-ethyl-thenylamino)-5-sulfamyl- 4-trifluoromethyl-benzoic acid, 2-(3,4-dimethyl-furfurylamino)-5-sulfamyl-4-trifluoromethyl-benzoic acid, 2-furfurylamino-5-sulfamyl-4-trifluoromethyl-benzoic acid, 2-thenylamino-5-sulfamyl-4-trifluoromethyl-benzoic acid, 2-(5-isoxazolyl-methylamino)-5-sulfamyl-4-trifluoromethyl-benzoic acid, 2-(2-oxazolyl-methylamino)-5-sulfamyl-4-trifluoromethyl-benzoic acid, 2-(2-thiazolyl-methylamino)-5-sulfamyl-4-trifluoromethyl-benzoic acid, 2-(2-pyrrylmethylamino)-5-sulfamyl-4-trifluoromethyl-benzoic acid, 2-(2-benzimidazolyl-methylamino)-5-sulfamyl-4-trifluoromethyl-benzoic acid, 2-(1- or 2-indolyl-amino)-5-sulfamyl-4-trifluoromethyl-benzoic acid, 2-(2-, 3- or 4-pyridyl-methylamino)-5-sulfamyl-4-trifluoromethyl-benzoic acid, 2-(5-methyl-2-pyridyl-methylamino)-5-sulfamyl-4-trifluoromethyl-benzoic acid, 2-[2-(2-pyridyl)-ethylamino]-5-sulfamyl-4-trifluoromethyl-benzoic acid, 2-dibenzylamino-5-sulfamyl-4-trifluoromethyl-benzoic acid, 2-(α-cyano-benzylamino)-5-sulfamyl-4-trifluoromethyl-benzoic acid, 2-(1-phenyl-ethylamino)-5-sulfamyl-4-trifluoromethyl-benzoic acid, 2-(2-phenyl-propylamino)-5-sulfamyl-4-trifluoromethyl-benzoic acid, 2-[2-(2-hydroxy-ethoxy)-ethylamino]-5-sulfamyl-4-trifluoromethyl-benzoic acid, 2-(4-diethoxy-butylamino)-5-sulfamyl-4-trifluoromethyl-benzoic acid, 2-(2-morpholino-ethylamino)-5-sulfamyl-4-trifluoromethyl-benzoic acid, 2-propargylamino-5-sulfamyl-4-trifluormethyl-benzoic acid, 2-(4-sulfamyl-benzylamino)-5-sulfamyl-4-trifluoromethyl-benzoic acid, 2-[2-(2,2,2-trifluoro-ethylmercapto)-ethylamino]-5-suflamyl-4-trifluoromethyl-benzoic acid and 2-carbamylmethylamino-5-sulfamyl-4-trifluoromethyl-benzoic acid.

EXAMPLE 3

To the solution of 3.1 g 2-chloro-5-sulfamyl-4-trifluoromethyl-benzoic acid in 6 ml 2-methoxy-ethanol, 5.2 ml furfurylamine are added and the mixture refluxed for 4 hours. After colling to room temperature 100 ml 2N-hydrochloric acid are added and the aqueous layer is decanted off. The residue is triturated with water whereupon it solidifies. It is filtered off, dissolved in 50 ml 2N aqueous sodium hydroxide, the solution filtered, the filtrate extracted with diethyl either and acidified with concentrated hydrochloric acid. The precipitate formed is filtered off and recrystallized from ethanol to yield the 2-furfurylamino-5-sulfamyl-4-trifluoromethyl-benzoic acid of the formula

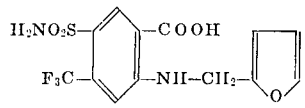

melting at 216° with decomposition.

The starting material is prepared as follows: In a 2 liter three-neck flask, fitted with stirrer, condenser and dropping funnel, the solution of 40 g 3-amino-4-bromo-benzotrifluoride in 550 ml 1,1,2,2-tetrachloroethane is placed and 13.2 ml chlorosulfonic acid in 100 ml 1,1,2,2-tetrachloroethane are added dropwise while stirring and cooling. The mixture is heated to 130°–140° for 4 hours, cooled to room temperature and filtered. The residue is washed with 1,1,2,2-tetrachloroethane, dissolved in 10 percent aqueous sodium carbonate and the solution extracted with 1,1,2,2-tetrachloroethane. The aqueous layer is filtered, the filtrate acidified with concentrated hydrochloric acid and, after cooling in an ice bath, filtered to yield the 5-bromo-2-trifluoromethyl-sulfamilic acid melting at 261°–263° with decomposition.

37.6 g thereof are added portionwise to 128 ml chlorosulfonic acid while stirring and the mixture is heated to about 113° for 3 hours. After cooling 55 ml thionylchloride are added and the mixture is heated for ½ hour to about 100°. It is cooled, poured onto ice, the residue formed filtered off, washed with a small amount of water and added to 970 ml concentrated aqueous ammonia. The mixture is heated on the steam bath for 1 ½ hours, cooled in an ice bath and the precipitate formed filtered off. It is washed with water and recrystallized from aqueous ethanol to yield the 5-bromo-2-trifluoromethyl-sulfanilamide melting at 200.5° to 201.5°.

The mixture of 15.0 g thereof, 12.6 g cuprous cyanide and 105 ml 1-methyl-2-pyrrolidone is kept at 153°–155° under nitrogen for 18 hours while stirring. It is then cooled, poured into 600 ml water, the mixture acidified with concentrated hydrochloric acid and filtered. The residue is washed with ethyl acetate and the filtrate extracted three times with ethyl acetate. The extract is washed twice with water, filtered, dried and evaporated in vacuo. The residue is triturated with isopropanol-chloroform (1:1), filtered off, washed with isopropanol-chloro-form and recrystallized from aqueous ethanol to yield the 5-sulfamyl-4-trifluoromethyl-anthranilic acid nitrile melting at 206°–209°.

0.5 g thereof are suspended in 10 ml 55 percent aqueous sulfuric acid and the mixture refluxed for ½ hour. It is poured onto ice, the precipitate formed filtered off, dissolved in aqueous sodium carbonate, the solution filtered, acidified with concentrated hydrochloric acid, the precipitate formed filtered off and recrystallized from water to yield the 5-sulfamyl-4-trifluoromethyl-anthrahilic acid melting at 258° with decomposition.

2.07 g thereof are dissolved in 15 ml water containing 0.7 g sodium bicarbonate and 0.52 g sodium nitrite. The solution is added dropwise to the stirred mixture of 2.6 ml concentrated hydrochloric acid and 10 ml water, keeping the temperature at 5°. The mixture is stirred for ½ hour and then added to a solution of cuprous chloride, which has been prepared by combining the solution of 2.0 g copper sulfate pentahydrate, 0.62 g sodium chloride in 7 ml water with that of 0.37 g sodium bisulfite in 1 ml water, filtering the precipitate off, washing it with water and adding it to the mixture of 4 ml concentrated hydrochloric acid and 4 ml water. The mixture is stirred at 55°–65 for 1 ½ hours, then cooled, filtered, the residue washed with water, and dried to yield the 2-chloro-5-sulfamyl-4-tri-fluoromethyl-benzoic acid melting at 233°–236° with decomposition.

EXAMPLE 4

The solution of 1.5 g 2-chloro-5-sulfamyl-4-trifluoromethyl-benzoic acid in 3 ml 2-methoxy-ethanol and 2.2 ml benzylamine is refluxed for 4 hours. After cooling to room temperature it is poured into 50 ml 2N-hydrochloric acid. The precipitate formed is filtered off, dissolved in about 30 ml 2N aqueous sodium hydroxide, the solution extracted three times with diethyl ether and the aqueous layer acidified with concentrated hydrochloric acid. The precipitate formed is filtered off and recrystallized from aqueous ethanol to yield the 2-benzylamino-5-sulfamyl-4-trifluoromethyl-benzoic acid melting (after drying in a high vacuum at 70°) at 240°–240° with decomposition; it is identical with the compound obtained according to Example 1.

EXAMPLE 5

To the solution of 1.9 g 2-chloro-5-methylsulfamyl-4-trifluoromethyl-benzoic acid in 6 ml 2-methoxy-ethanol, 3 ml furfurylamine are added and the mixture refluxed for 4 hours under nitrogen. After cooling the mixture is poured into 75 ml 2N-hydrochloric acid, the precipitate formed filtered off, washed with water and recrystallized twice from aqueous ethanol to yield the 2-furfurylamino-5-methylsulfamyl-4-trifluoromethyl-benzoic acid of the formula

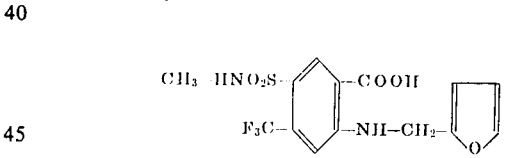

melting at 201°–202° with decomposition.

The starting material is prepared as follows: 26.0 g 5-bromo-2-trifluoromethyl-sulfanilic acid are added portionwise to 93 ml chlorosulfonic acid while stirring at room temperature. The mixture is then heated to 113°–115° for 3 hours. After cooling, 39 ml thionyl chloride are added and the mixture heated for ½ hour to about 95°. It is cooled, poured onto ice while stirring, the residue formed filtered off, washed with water and added to 125 ml of 25 percent aqueous methylamine while cooling in an ice bath. The mixture is stirred at room temperature for 2 ½ hours whereupon the solid is filtered off. It is washed with diluted hydrochloric acid and water and recrystallized from aqueous ethanol to yield the 5-bromo-2-trifluoromethyl-N-methyl-sulfanilamide melting at 155°–156°.

The mixture of 13.2 g thereof, 10.7 g cuprous cyanide and 100 ml 1-methyl-2-pyrrolidone is stirred for 18 hours at 150° under nitrogen. It is cooled, poured into 500 ml water, the mixture acidified with concentrated hydrochloric acid and filtered. The residue is washed with water and recrystallized from ethanol to yield the 5-methylsulfamyl-4-trifluoromethyl-anthranilic acid nitrile melting at 240°–243°.

4 g thereof are suspended in 80 ml 55 percent aqueous sulfuric acid and the mixture refluxed for ½ hour. It is poured onto ice, the precipitate formed filtered off, dissolved in aqueous sodium carbonate, the solution filtered, acidified with concentrated hydrochloric acid, the precipitate formed filtered off and recrystallized from aqueous ethanol to yield the 5-methylsulfamyl4-trifluoromethyl-anthranilic acid melting at 263° with decomposition.

2.3 g thereof are dissolved in the mixture of 0.7 g sodium bicarbonate, 0.55 g sodium nitrite and 45 ml water. This solution is added drop-wise to the mixture of 3 ml concentrated hydrochloric acid and 10 ml water during 45 minutes while stirring at 0°. The mixture is stirred at 5° for another 45 minutes and then added drop-wise during 10 minutes at room temperature to the solution of cuprous chloride, which has been prepared by combining the solution of 2.2 g copper sulfate pentahydrate and 0.7 g sodium chloride in 10 ml water with that of 0.4 g sodium bisulfite in 2 ml water, filtering the precipitate off, washing it with water, and adding it to the mixture of 4.3 ml concentrated hydrochloric acid and 4.3 ml water. The mixture is heated to 60° for 1 ½ hours, then cooled and extracted 3 times with ethyl acetate. The extract is dried, evaporated in vacuo and the residue recrystallized from chloroform to yield the 2-chloro-5-methylsulfamyl-4-trifluoromethyl-benzoic acid melting at 208°-212°.

EXAMPLE 6

The mixture of 1.3 g 2-chloro-5-phenylsulfamyl-4-trifluoromethyl-benzoic acid, 1.4 ml furfurylamine and 6 ml 2-methoxy-ethanol is refluxed under nitrogen for 4 hours. It is allowed to stand overnight at room temperature and poured into diluted hydrochloric acid. The precipitate formed is filtered off, washed with water and dissolved in 2N aqueous sodium hydroxide. The solution is extracted twice with diethyl ether, the aqueous layer separated, acidified with hydrochloric acid and the precipitate formed filtered off. It is washed with water, dried, dissolved in chloroform-formic acid-isopropanol (9:1:2) and chromotographed on silica gel. The eluate obtained is evaporated and the residue recrystallized from chloroform-hexane to yield the 2-furfurylamino-5-phenylsulfamyl-4-trifluoromethyl-benzoic acid of the formula

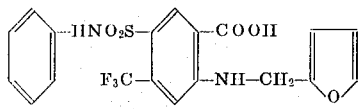

melting at 180°-185° with decomposition.

The starting material is prepared as follows: The mixture of 49 g 5-bromo-2-trifluoromethyl-sulfanilic acid and 175 ml chlorosulfonic acid is heated for 3 hours to 115°. After cooling 75 ml thionyl chloride are added and the mixture kept for ½ hour at 95°. It is poured over ice, the precipitate formed filtered off, washed with water, dissolved in 700 ml ethyl acetate, the solution washed with water and dried. It is added to the solution of 60 ml aniline in 100 ml ethyl acetate while stirring and stirring is continued for 4 hours at room temperature. After standing overnight, diluted hydrochloric acid is added, the organic layer separated, washed with diluted hydrochloric acid, water, aqueous sodium bicarbonate and dried. It is evaporated in vacuo and the residue recrystallized from ethanol to yield the 5-bromo-2-trifluoromethyl-sulfanilic acid phenylamide melting at 208°-210°.

The mixture of 17 g thereof, 11.6 g cuprous cyanide and 110 ml 1-methyl-2-pyrrolidone is heated under nitrogen to 140° for 17 hours while stirring. After cooling, it is poured into 300 ml water, the mixture acidified with hydrochloric acid and extracted with 500 ml ethyl acetate. The extract is filtered, the filtrate washed with diluted hydrochloric acid and water, dried and evaporated under reduced pressure. The residue is dissolved in hot ethanol, the solution treated with charcoal, diluted with water and kept in the cold. The crystals separated are collected and dried to yield the 5-phenylsulfamyl-4-trifluoromethyl-anthranilic acid nitrile melting at 185°-188°.

The mixture of 5 g thereof and 50 ml 35 percent aqueous sodium hydroxide is refluxed for 1 ½ hours. It is cooled, diluted with water and acidified with sulfuric acid. The precipitate formed is filtered off, washed with water and recrystallized from aqueous ethanol to yield the corresponding acid melting at 269° with decomposition.

The solution of 2.0 g thereof in 60 ml glacial acetic acid is added dropwise during ½ hour to the solution obtained from 0.42 g sodium nitrite and 4 ml concentrated sulfuric acid at 10°-15 while stirring. The mixture is stirred for 40 minutes at that temperature and then added rapidly to the solution of cuprous chloride(prepared from 2.8 g cupric sulfate pentahydrate in 10 ml hot water, 0.8 g sodium chloride and 0.58 g sodium bisulfite) in 5 ml concentrated hydrochloric acid and 5 ml water at 40°-50°. The mixture is then heated to 65° for 1 ½ hours, cooled and diluted with water. The precipitate formed is filtered off, washed with water and recrystallized from aqueous ethanol to yield the 2-chloro-5-phenylsulfamyl-4-trifluoromethyl-benzoic acid melting at 183°—184°.

EXAMPLE 7

160,000 tablets each containing 100 mg of the active ingredient:

Formula:
| | |
|---|---|
| 2-furfurylamino-5-sulfamyl-4-trifluoro-methyl-benzoic acid | 16,000 g |
| Lactose | 16,290 g |
| Corn Starch | 3,410 g |
| Confectioners Sugar | 2,800 g |
| Colloidal Silica | 1,000 g |
| Stearic Acid | 400 g |
| Calcium Stearate | 100 g |
| Purified Water | q.s. |

Procedure:

The active ingredient, lactose, 2,5000 g of the corn starch, the sugar and colloidal cilica are passed through a 16 mesh screen and mixed for 20 minutes. The remaining corn starch is suspended in 1,000 ml cold water and the suspension added to 4,000 ml boiling water. The mixed powders are granulated with the paste obtained using additional water as required. The granulate is passed through a 5 mesh screen, placed on trays and dried at 38° until the moisture content is between 2 and 3 percent. The granules are broken on a mill, passed through a 16 mesh screen and treated with the stearic acid and calcium stearate both screened through a 20 mesh screen. After mixing for 20 minutes, the granulate is compressed into tablets using 11/32 inch dies, standard concave punches, uppers bisected lowers monogrammed. (The sieve sizes used are mesh per inch).

EXAMPLE 8

The mixture of 1.0 g 2-furfurylamino-5-sulfamyl-4-trifluoromethyl-benzoic acid N'-benzylhydrazide, 10 ml 2N-aqueous sodium hydroxide, 10 ml 2-methoxy-ethanol and 3 ml water, is refluxed under nitrogen for 2 hours. It is cooled, poured into 20 ml 2N-hydrochloric acid, the precipitate formed filtered off and dissolved in 10 percent aqueous potassium carbonate. The solution is washed with ethyl acetate, acidified with hydrochloric acid, the precipitate formed filtered off and recrystallized from aqueous ethanol to yield the 2-furfurylamino-5-sulfamyl-4-trifluoromethyl-benzoic acid melting at 216° with decomposition; it is identical with the compound obtained according to Example 3.

The starting material is prepared as follows: The mixture of 6.1 g 2-chloro-5sulfamyl-4-trifluoromethyl-benzoic acid, 50 ml 1,2-dimethoxy-ethane and 8 ml thionyl chloride is refluxed for 90 minutes and evaporated in vacuo. The residue is triturated with hexane and filtered off to yield the 2-chloro-5-sulfamyl-4-trifluoromethyl-benzoic acid chloride.

6.0 g thereof are added in portions to the solution of 2.5 g benzylhydrazine in 100 ml chloroform and 2.0 g triethylamine, during 10 minutes while stirring. The mixture is stirred at room temperature for 18 hours and evaporated in vacuo. The residue is dissolved in ethyl acetate, the solution washed with water, dried and evaporated. The residue is purified by chromatography on aluminum oxide to yield the 2-chloro-5-sulfamyl-4-trifluoromethyl-benzoic acid-N'-benzylhydrazide.

The mixture of 4.0 g thereof, 12 ml 2-methoxy-ethanol and 3.9 g furfurylamine is refluxed for 3 hours, cooled and poured into 50 ml 2N-hydrochloric acid. The precipitate formed is collected and dissolved in ethylacetate. The solution is washed with diluted hydrochloric acid and water, dried and evaporated. The residue is triturated with diethyl ether and hexane, to yield the 2-furfurylamino-5-sulfamyl-4-trifluoromethyl-benzoic acid N'-benzylhydrazide, which is used as such without further purification.

EXAMPLE 9

20,000 tablets each containing 100 mg of the active ingredient:

Formula:
| | |
|---|---|
| 2-chloro-5-sulfamyl-4-trifluoromethyl-benzoic acid N'-benzylhydrazide | 2,000.0 g |
| Gelatin | 150.0 g |
| Corn Starch (anhydrous) | 1,659.0 g |
| Talcum | 625.0 g |
| Stearic Acid | 66.0 g |
| Purified Water | q.s. |

Procedure:

The active ingredient and 726 g of the starch are passed through a screen with 1 mm openings and mixed thoroughly. The gelatin is dissolved in 2 liters water, the solution combined with a suspension of 308 g starch in 400 ml cold water and the whole heated on the water bath until a paste is formed. It is combined with the sieved powders using additional water, if necessary. The granulate is passed through a screen with 4 mm openings, dried at 49° and broken on a screen with 2 mm openings of a comminuting machine, knives forward. To the granulate the remaining starch, talcum and stearic acid are added while mixing and the mixture is compressed into tablets using standard concave punches double score.

We claim:

1. A compound of the formula

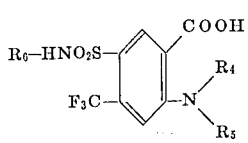

in which $R_4$ is benzyl, 1-phenylethyl, 2-phenylethyl, furfuryl or thenyl, $R_5$ is hydrogen and $R_6$ is phenyl, benzyl, 1-phenylethyl, 2-phenylethyl, furfuryl or thenyl, or an alkali metal salt, an alkaline earth metal salt or the ammonium salt of carboxylic acid.

2. A compound as claimed in claim 1 and being the 2-furfurylamino-5-phenylsulfamyl-4-trifluoromethyl-benzoic acid.

3. A compound having the formula

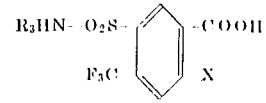

in which X is fluoro, chloro or bromo and $R_3$ is phenyl, benzyl, 1-phenylethyl, 2-phenylethyl, furfuryl or thenyl, or the amide, mono- or di-lower alkylamide, the hydrazide, N'-lower alkylhydrazide or N',N'-di-lower alkylhydrazide, alkali metal salt, alkaline earth metal salt or the ammonium salt of the carboxylic acid.

4. A compound having the formula

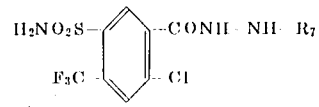

in which $R_7$ is benzyl.

5. A compound as claimed in claim 3 and being the 2-chloro-5-phenyl-sulfamyl-4-trifluoromethylbenzoic acid.

6. A compound having the formula

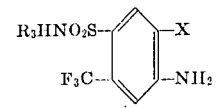

in which X is halogen and $R_3$ is hydrogen, methyl, phenyl, benzyl, 1-phenylethyl, 2-phenylethyl, furfuryl or thenyl 7. A compound as claimed in claim 6, in which formula X is bromine and $R_3$ is hydrogen, methyl or phenyl.

8. A compound having the formula

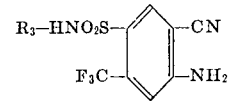

in which $R_3$ is hydrogen, methyl, phenyl, benzyl, 1-phenylethyl, 2-phenylethyl, furfuryl or thenyl 9. A compound as claimed in claim 8, in which formula $R_3$ is hydrogen, methyl or phenyl.

* * * * *

UNITED STATES PATENT OFFICE
CERTIFICATE OF CORRECTION

Patent No. 3,678,039  Dated July 18, 1972

Inventor(s) Lincoln Harvey Werner et al.

It is certified that error appears in the above-identified patent and that said Letters Patent are hereby corrected as shown below:

On the Title page, the following should be added:

-- [73] Assignee: Ciba Corporation, New York, N.Y. --

Signed and sealed this 17th day of December 1974.

(SEAL)
Attest:

McCOY M. GIBSON JR.  C. MARSHALL DANN
Attesting Officer  Commissioner of Patents